US012738414B2

(12) United States Patent
Cha et al.

(10) Patent No.: US 12,738,414 B2
(45) Date of Patent: Sep. 15, 2026

(54) COIL COMPONENT

(71) Applicant: SAMSUNG ELECTRO-MECHANICS CO., LTD., Suwon-si (KR)

(72) Inventors: Yoon Mi Cha, Suwon-si (KR); Ju Hwan Yang, Suwon-si (KR); Seung Mo Lim, Suwon-si (KR); No Il Park, Suwon-si (KR); Tai Yon Cho, Suwon-si (KR); Byeong Cheol Moon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1157 days.

(21) Appl. No.: 17/733,047

(22) Filed: Apr. 29, 2022

(65) Prior Publication Data

US 2022/0392697 A1 Dec. 8, 2022

(30) Foreign Application Priority Data

May 20, 2021 (KR) ........................ 10-2021-0064596

(51) Int. Cl.
*H01F 27/32* (2006.01)
*H01F 27/28* (2006.01)
*H01F 27/29* (2006.01)

(52) U.S. Cl.
CPC ....... *H01F 27/324* (2013.01); *H01F 27/2804* (2013.01); *H01F 27/292* (2013.01)

(58) Field of Classification Search
CPC ............... H01F 27/324; H01F 27/2804; H01F 27/292
See application file for complete search history.

(56) References Cited

U.S. PATENT DOCUMENTS

2016/0268038 A1* 9/2016 Choi ..................... H01F 27/255
2018/0182537 A1* 6/2018 Shimizu .................. H01F 27/29
(Continued)

FOREIGN PATENT DOCUMENTS

CN 110739116 A 1/2020
CN 111916279 A 11/2020
(Continued)

OTHER PUBLICATIONS

Notice of Reason for Rejection dated Aug. 8, 2025 issued in the corresponding Korean Patent Application No. 10-2021-0064596 with the translation.
(Continued)

*Primary Examiner* — Malcolm Barnes
(74) *Attorney, Agent, or Firm* — Morgan Lewis & Bockius LLP

(57) ABSTRACT

A coil component may include a body, a coil portion including first and second lead-out portions spaced apart from each other, first and second slit portions formed at an edge portion and exposing the first and second lead-out portions, first and second external electrodes disposed to be spaced apart from each other on one surface of the body, and extending onto the first and second slit portions, respectively, to be connected to the first and second lead-out portions, a slit insulating layer covering at least portions of the first and second external electrodes in the first and second slit portions, and a surface insulating layer disposed on the slit insulating layer and extending to cover at least portions of the first or second external electrodes disposed on the one surface of the body.

18 Claims, 10 Drawing Sheets

(56) References Cited

U.S. PATENT DOCUMENTS

| | | | | |
|---|---|---|---|---|
| 2019/0304672 | A1* | 10/2019 | Kang | H01F 27/363 |
| 2020/0027647 | A1* | 1/2020 | Yang | H01F 17/0013 |
| 2020/0118729 | A1* | 4/2020 | Lim | H01F 41/041 |
| 2020/0357565 | A1 | 11/2020 | Li et al. | |
| 2021/0043340 | A1 | 2/2021 | Hoshino | |
| 2021/0057138 | A1 | 2/2021 | Yang et al. | |

FOREIGN PATENT DOCUMENTS

| | | | |
|---|---|---|---|
| CN | 212694923 | A | 3/2021 |
| JP | 2018-107346 | A | 7/2018 |
| KR | 10-2145312 | B1 | 8/2020 |
| KR | 10-2021-0022363 | A1 | 3/2021 |

OTHER PUBLICATIONS

Chinese Office Action dated May 12, 2026 issued in Chinese Patent Application No. 202210555475.1 (with English translation).

* cited by examiner

A

COIL COMPONENT

CROSS-REFERENCE TO RELATED APPLICATION(S)

This application claims benefit of priority to Korean Patent Application No. 10-2021-0064596 filed on May 20, 2021 in the Korean Intellectual Property Office, the disclosure of which is incorporated herein by reference in its entirety.

BACKGROUND

1. Field

The present disclosure relates to a coil component.

2. Description of Related Art

An inductor, a coil component, is a representative passive electronic component used in an electronic device together with a resistor and a capacitor.

As electronic devices become increasingly high-performance and small, the number of electronic components used in electronic devices is increasing and miniaturizing.

An external electrode of the coil component is typically formed by applying and curing a conductive paste on both end surfaces opposing a length direction of a component body. In this case, the overall length of the component may be increased. In addition, when a component on which the external electrode is formed is mounted on a substrate, a bonding member such as solder may be formed to extend from the component in a width direction and a length direction of the component, respectively, on a substrate mounting surface, to thereby increase an effective mounting area of the component.

SUMMARY

An aspect of the present disclosure may improve a chipping defect of a lower edge portion during a dicing process of a coil component.

An aspect of the present disclosure may provide a coil component being light, thin, and compact for easy mounting.

According to an aspect of the present disclosure, the coil component may include: a body having a first surface, with a first end surface and a second end surface opposing each other; a coil portion including first and second lead-out portions spaced apart from each other and disposed in the body; first and second slit portions respectively formed at an edge portion between the first end surface and the first surface of the body and an edge portion between the second end surface of the body and the first surface of the body, and exposing the first and second lead-out portions; first and second external electrodes disposed to be spaced apart from each other on the first surface of the body, and extending onto the first and second slit portions, respectively, to be connected to the first and second lead-out portions; a slit insulating layer covering at least portions of the first and second external electrodes in the first and second slit portions; and a surface insulating layer disposed on the slit insulating layer and extending to cover at least portions of the first or second external electrodes disposed on the first surface of the body.

According to another aspect of the present disclosure, a coil component may include: a body having a first surface, with a first end surface and a second end surface respectively connected to the first surface and opposing each other; a coil portion including first and second lead-out portions spaced apart from each other and exposed to the first end surface and the second end surface of the body, respectively; first and second external electrodes disposed to be spaced apart from each other on the first surface of the body, and extending onto the first end surface and the second end surface of the body, respectively, to be connected to the first and second lead-out portions; a lower insulating layer covering at least portions of an area of the first surface of the body excluding the first and second external electrodes; and a surface insulating layer covering at least portions of the first and second external electrodes on the first end surface and the second end surface of the body, respectively, and disposed on the lower insulating layer on the first surface of the body, in which the surface insulating layer may cover at least portions of the first or second external electrodes disposed on the first surface of the body, and extend to cover at least portions of the first and second external electrodes from a boundary portion between each of the first and second external electrodes and the lower insulating layer.

According to still another aspect of the present disclosure, a coil component may include: a body having a first surface, with a first end surface and a second end surface respectively connected to the first surface and opposing each other; a coil portion including at least one coil pattern, and first and second lead-out portions spaced apart from each other and extending to the first and second end surfaces, respectively; first and second external electrodes disposed to be spaced apart from each other on the first surface of the body, and bending toward the first and second lead-out portions to be connected to the first and second lead-out portions, respectively; and at least two insulating layers disposed on the first surface the body and overlapping each other in a thickness direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
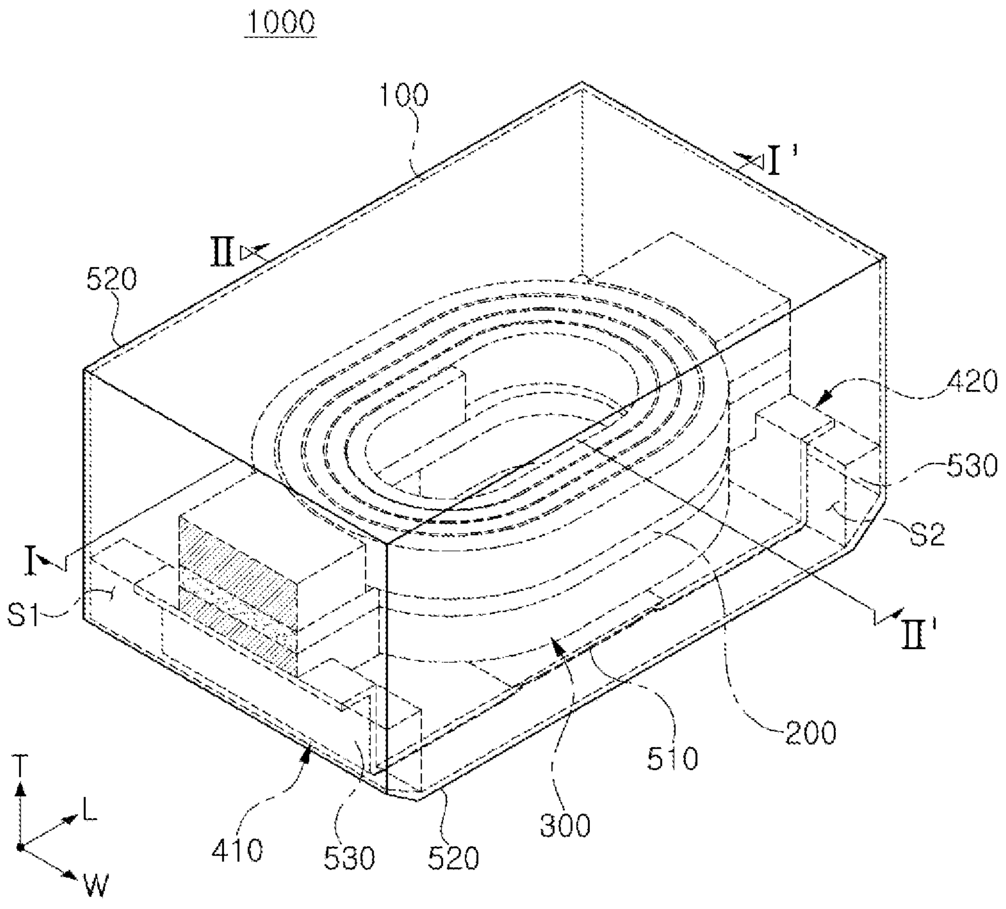
FIG. 1 is a schematic perspective view illustrating a coil component according to an exemplary embodiment in the present disclosure.

Terms used in the present specification are used only in order to describe specific exemplary embodiments rather than limiting the present disclosure. Singular forms are intended to include plural forms unless the context clearly indicates otherwise. It will be further understood that the terms "comprises" or "have" used in this specification, specify the presence of stated features, steps, operations, components, parts mentioned in this specification, or a combination thereof, but do not preclude the presence or addition of one or more other features, numerals, steps, operations, components, parts, or a combination thereof. In addition, throughout the specification, the word "on" does not necessarily mean that any element is positioned at an upper side based on a gravity direction, but means that any element is positioned above or below a target portion.

Further, a term "couple" not only refers to a case in which respective components are in physically direct contact with each other, but also refers to a case in which the respective components are in contact with another component with another component interposed therebetween, in a contact relationship between the respective components.

Since sizes and thicknesses of the respective components illustrated in the drawings are arbitrarily illustrated for convenience of explanation, the present disclosure is not necessarily limited to those illustrated in the drawings.

In the drawings, an L direction refers to a first direction or a length direction, a W direction refers to a second direction or a width direction, and a T direction refers to a third direction or a thickness direction.

Hereinafter, coil components according to exemplary embodiment in the present disclosure will be described in detail with reference to the accompanying drawings. In describing exemplary embodiments in the present disclosure with reference to the accompanying drawings, components that are the same as or correspond to each other will be denoted by the same reference numerals, and an overlapping description therefor will be omitted.

Various kinds of electronic components may be used in an electronic device, and various kinds of coil components may be appropriately used between these electronic components depending on their purposes in order to remove noise, or the like.

That is, the coil components used in the electronic device may be a power inductor, high frequency (HF) inductors, a general bead, a bead for a high frequency (GHz), a common mode filter, and the like.

First Exemplary Embodiment and Modification

Figure 2:
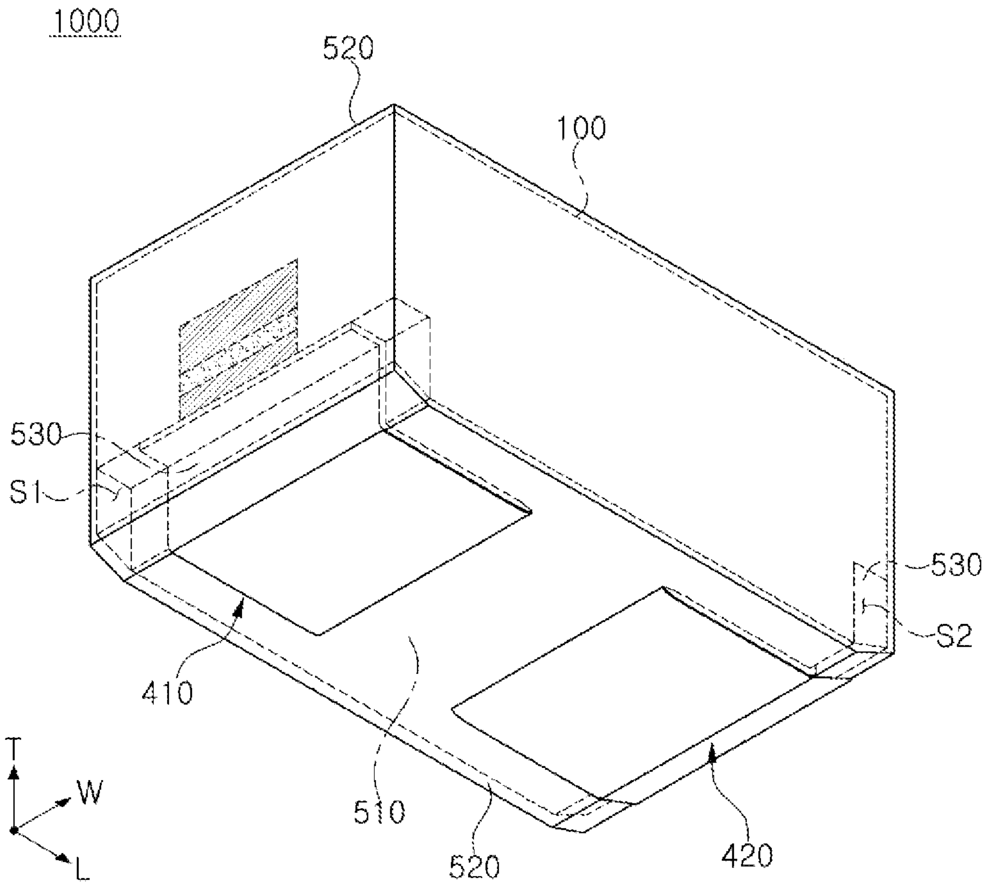
FIG. 2 is a diagram illustrating the coil component of FIG. 1 as viewed from a lower side.
Figure 3:
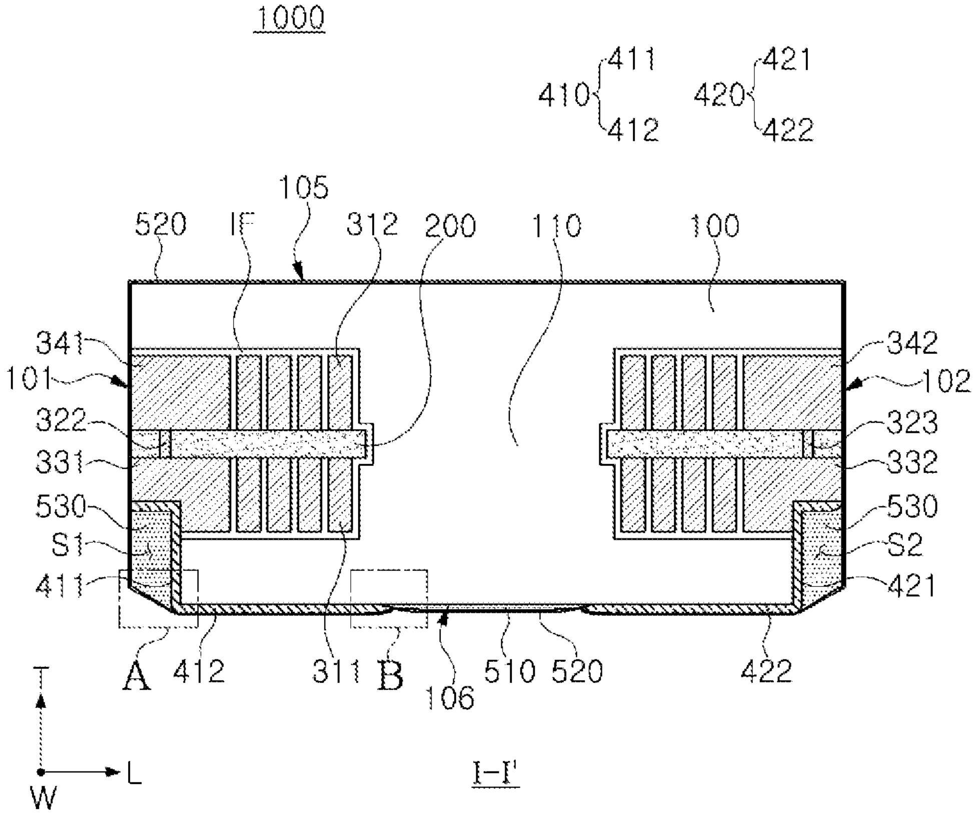
FIG. 3 is a cross-sectional view taken along line I-I' of FIG. 1.
Figure 4:
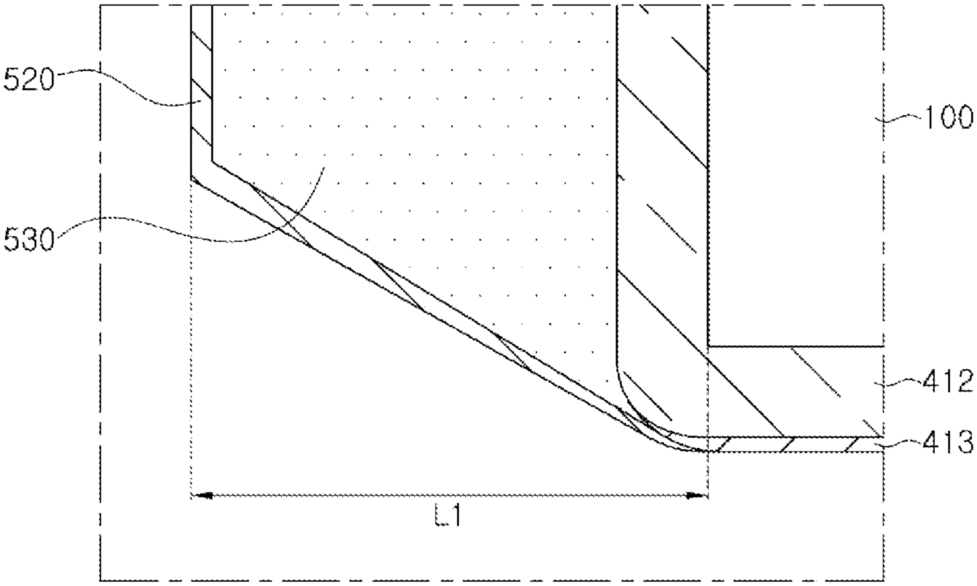
FIG. 4 is an enlarged diagram illustrating area A of FIG. 3.
Figure 5:
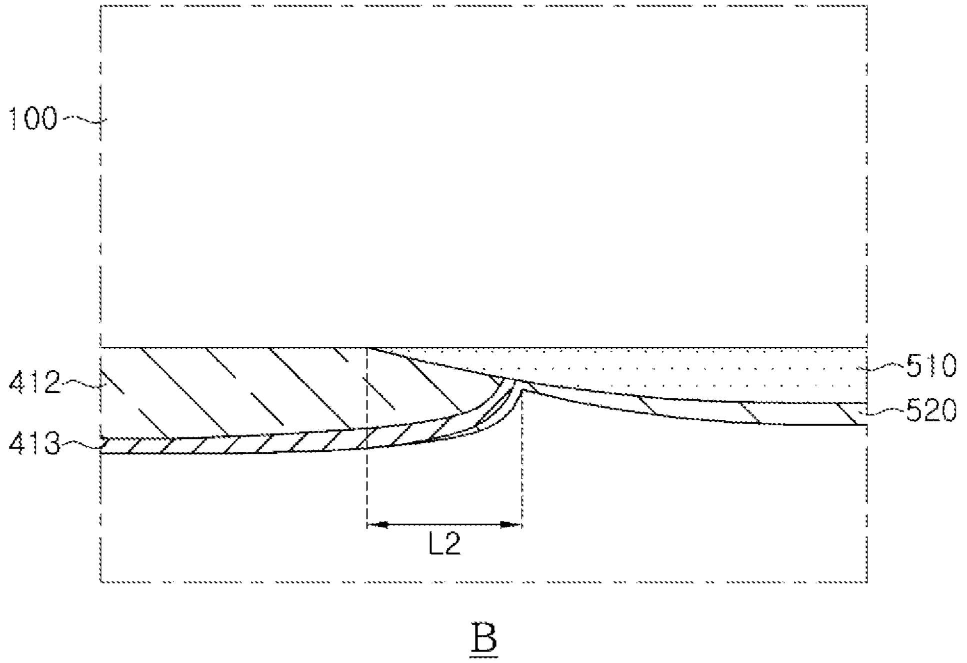
FIG. 5 is an enlarged view illustrating area B of FIG. 3.
Figure 6:
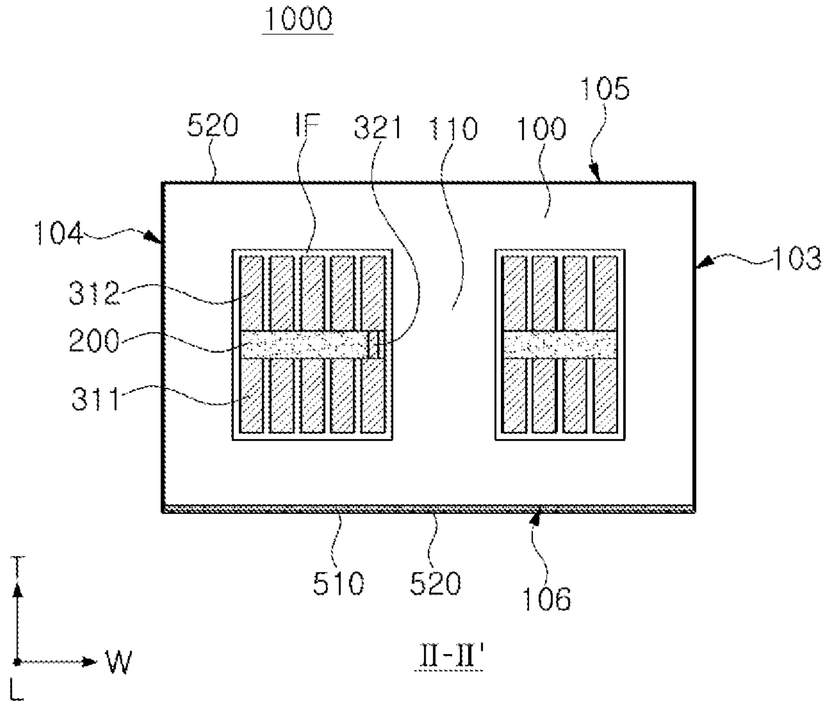
FIG. 6 is a cross-sectional view taken along line II-II' of FIG. 1.
Figure 7:
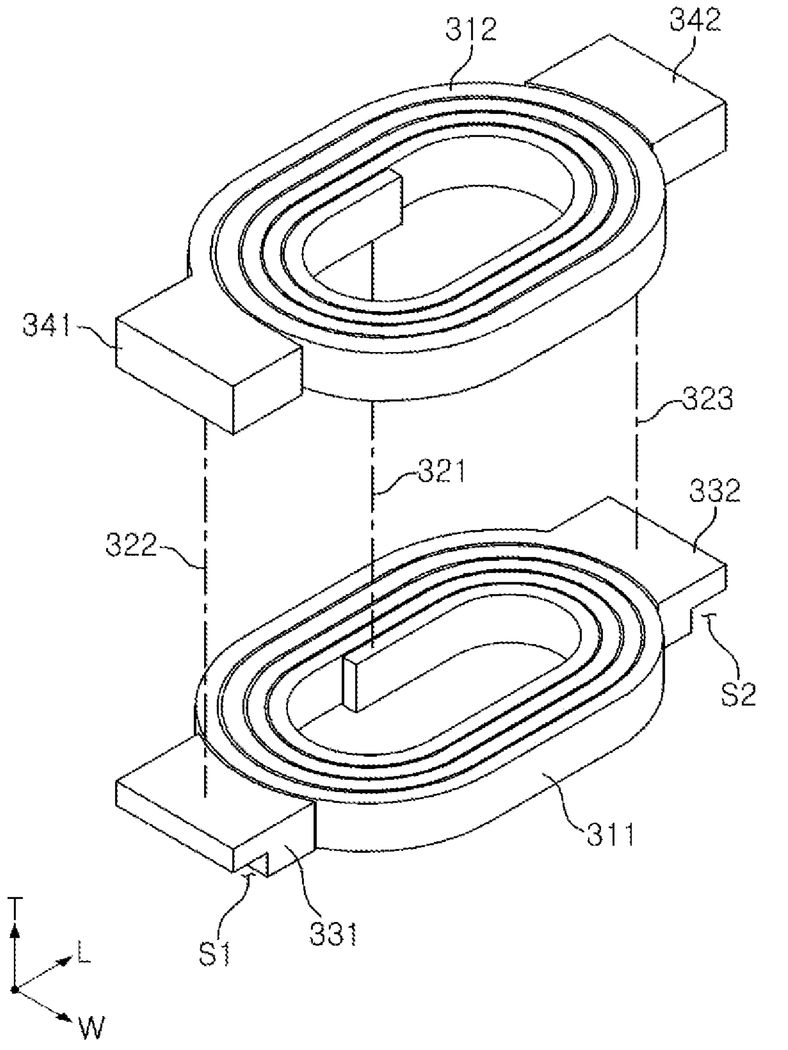
FIG. 7 is a diagram schematically illustrating a connection relationship of a coil portion.
Figure 8:
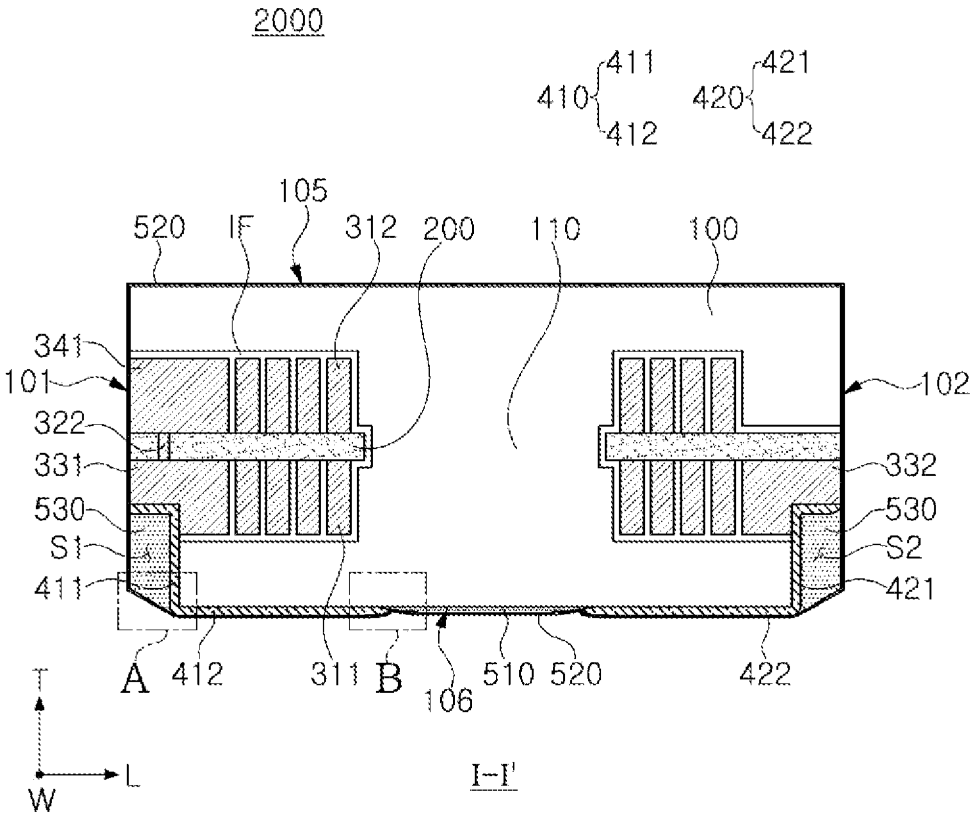
FIG. 8 is a diagram illustrating a modified example corresponding to FIG. 3.

FIG. 1 is a perspective view schematically illustrating a coil component 1000 according to an exemplary embodiment in the present disclosure. FIG. 2 is a diagram illustrating the coil component 1000 of FIG. 1 as viewed from the lower side. FIG. 3 is a cross-sectional view taken along line I-I' of FIG. 1. FIG. 4 is an enlarged diagram illustrating area A of FIG. 3. FIG. 5 is an enlarged view illustrating area B of FIG. 3. FIG. 6 is a cross-sectional view taken along line II-II' of FIG. 1. FIG. 7 is a diagram schematically illustrating a connection relationship of a coil portion 300. FIG. 8 is a diagram illustrating a modified example corresponding to FIG. 3.

Referring to FIGS. 1 to 7, a coil component 1000 according to an exemplary embodiment in the present disclosure may include a body 100, a substrate 200, a coil portion 300, slit portions S1 and S2, external electrodes 410 and 420, insulating layers 510, 520, and 530, and may further include an insulating film IF.

The body 100 may form an appearance of the coil component 1000 according to the present exemplary embodiment, and may have the substrate 200 and the coil portion 300 buried therein.

The body 100 may generally have a hexahedral shape.

The body 100 may have a first surface 101 and a second surface 102 opposing each other in a length direction L, a third surface 103 and a fourth surface 104 opposing each other in a width direction W, and a fifth surface 105 and a sixth surface 106 opposing each other in a thickness direction T, based on a direction of FIGS. 1 to 6. The first to fourth surfaces 101, 102, 103, and 104 of the body 100 may correspond to walls of the body 100 that connect the fifth surface 105 and the sixth surface 106 of the body 100 to each other. Hereinafter, both end surfaces (one end surface and the other end surface) of the body 100 may refer to the first surface 101 and the second surface 102 of the body 100, and both side surfaces (one side surface and the other side surface) of the body 100 may refer to the third surface 103 and the fourth surface 104 of the body 100. In addition, one surface and a lower surface of the body 100 may refer to the sixth surface 106 of the body 100, and the other surface and upper surface of the body 100 may refer to the fifth surface 105 of the body 100.

The body 100 may be formed so that the coil component 1000 according to the present exemplary embodiment in which the external electrodes 410 and 420 and the insulating layers 510, 520, and 530 to be described later are formed may have a length of 1.4 mm, a width of 1.2 mm, and a thickness of 0.5 mm, or a length of 2.0 mm, a width of 1.2 mm, and a thickness of 0.65 mm by way of example, but is not limited thereto. Meanwhile, the dimensions described above are merely design values that do not reflect process errors and the like, and it is thus to be considered that dimensions within ranges admitted as the processor errors fall within the scope of the present disclosure.

The length of the coil component 1000 described above may refer to a maximum length of lengths of a plurality of segments that connect between the outermost boundary lines of the coil component 1000 illustrated in an image of a cross-section of the coil component 1000 in the length direction L-thickness direction T at a central portion of the coil component 1000 in the width direction W, captured by an optical microscope or a scanning electron microscope (SEM), and are parallel to the length direction L. Alternatively, the length of the coil component 1000 described above may refer to an arithmetic mean value of lengths of three or more of a plurality of segments that connect between the outermost boundary lines of the coil component 1000 illustrated in the image of the cross-section and are parallel to the length direction L.

The thickness of the coil component 1000 described above may refer to a maximum length of lengths of a plurality of segments that connect between the outermost boundary lines of the coil component 1000 illustrated in an image of a cross section of the coil component 1000 in the length direction L-thickness direction T at a central portion of the coil component 1000 in the width direction W, captured by an optical microscope or an SEM, and are parallel to the thickness direction T. Alternatively, the thickness of the coil component 1000 described above may refer to an arithmetic mean value of lengths of three or more of a plurality of segments that connect between the outermost boundary lines of the coil component 1000 illustrated in the image of the cross section and are parallel to the thickness direction T.

The width of the coil component 1000 described above may refer to a maximum length of lengths of a plurality of segments that connect between the outermost boundary lines of the coil component 1000 illustrated in an image of a cross section of the coil component 1000 in the width direction W-thickness direction T at a central portion of the coil component 1000 in the length direction L, captured by an optical microscope or an SEM, and are parallel to the width direction W. Alternatively, the width of the coil component 1000 described above may refer to an arithmetic mean value of lengths of three or more of a plurality of segments that connect between the outermost boundary lines of the coil component 1000 illustrated in the image of the cross section and are parallel to the width direction W.

Alternatively, each of the length, the width, and the thickness of the coil component 1000 may be measured by a micrometer measurement method. In the micrometer measurement method, each of the length, the width, and the thickness of the coil component 1000 may be measured by setting a zero point with a gage repeatability and reproducibility (R&R) micrometer, inserting the coil component 1000 according to the present example exemplary embodiment between tips of micrometer, and turning a measuring lever of micrometer. Meanwhile, in measuring the length of the coil component 1000 by the micrometer measurement method, the length of the coil component 1000 may refer to a value measured once or refer to an arithmetic mean of values measured plural times. This may also be similarly applied to the width and the thickness of the coil component 1000.

The body 100 may include magnetic materials and a resin. Specifically, the body 100 may be formed by stacking one or more magnetic composite sheets in which the magnetic materials are dispersed in the resin. However, the body 100 may also have a structure other than a structure in which the magnetic materials are dispersed in the resin. For example, the body 100 may be formed of a magnetic material such as ferrite.

The magnetic material may be ferrite or metal magnetic powder particles.

The ferrite may be, for example, one or more of spinel type ferrites such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, Li-based ferrite.

The metal magnetic powder particles may include one or more selected from the group consisting of iron (Fe), silicon (Si), chromium (Cr), cobalt (Co), molybdenum (Mo), aluminum (Al), niobium (Nb), copper (Cu), boron (B), zirconium (Zr), hafnium (Hf), phosphorus (P), and nickel (Ni). For example, the magnetic metal powder particles may include at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si-based alloy powder, Fe—Si—Cu—Nb-based alloy powder, Fe—Ni—Cr-based powder, and Fe—Cr—Al-based alloy powder.

The metal magnetic powder particles may include amorphous or crystalline. For example, the metal magnetic powder particles may be a Fe—Si—B—Cr based amorphous metal powder, but is not necessarily limited thereto.

The metal magnetic powder particles may each have an average diameter of about 0.1 μm to 30 μm, but are not limited thereto.

The body 100 may include two kinds or more of magnetic materials dispersed in the resin. Here, different kinds of magnetic materials mean that the magnetic materials dispersed in the resin are distinguished from each other by any one of an average diameter, a composition, crystallinity, and a shape.

The resin may include epoxy, polyimide, liquid crystal polymer (LCP), or the like, or mixtures thereof, but is not limited thereto.

The body 100 may include a core 110 penetrating through the coil portion 300 to be described later. The core 110 may be formed by filling a through-hole inside the coil portion 300 with the magnetic composite sheet, but is not limited thereto.

The substrate 200 may be disposed in the body 100. The substrate 200 may be configured to support the coil portion 300 to be described later.

The substrate 200 may be formed of an insulating material including a thermosetting resin such as an epoxy resin, a thermoplastic resin such as a polyimide resin, or a photosensitive insulating resin or be formed of an insulating material having a reinforcement material such as a glass fiber or an inorganic filler impregnated in such an insulating resin. As an example, the substrate 200 may be formed of an insulating material such as prepreg, an Ajinomoto Build-up Film (ABF), FR-4, a Bismaleimide Triazine (BT) resin, a photoimagable dielectric (PID), or a copper clad laminate (CCL), but is not limited thereto.

As the inorganic filler, one or more materials selected from the group consisting of silica (silicon dioxide, $SiO_2$), alumina (aluminum oxide, $Al_2O_3$), silicon carbide (SiC), barium sulfate ($BaSO_4$), talc, clay, mica powder particles, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the substrate 200 is formed of the insulating material including the reinforcing material, the substrate 200 may provide more excellent rigidity. When the substrate 200 is formed of an insulating material that does not include glass fibers, the substrate 200 is advantageous in reducing the overall thickness of the coil portion 300. When the substrate 200 is formed of an insulating material including the photosensitive insulating resin, the number of processes for forming the coil portion 300 may be decreased, which may be advantageous in reducing a production cost and may be advantageous in forming fine vias.

The thickness of the substrate 200 may be, for example, 10 μm or more and 50 μm or less, but is not limited thereto.

The slit portions S1 and S2 are formed on an edge portion of the sixth surface 106 of the body 100. Specifically, the slit portions S1 and S2 may be formed along an edge portion between each of the first and second surfaces 101 and 102 of the body 100 and the sixth surface 106 of the body 100. That is, the first slit portion S1 may be formed along the edge portion between the first surface 101 of the body 100 and the sixth surface 106 of the body 100, and the second slit portion S2 may be formed along the edge portion between the second surface 102 of the body 100 and the sixth surface 106 of the body 100. The slit portions S1 and S2 may have a shape extending from the third surface 103 to the fourth surface 104 of the body 100. Meanwhile, the slit portions S1 and S2 do not extend to the fifth surface 105 of the body 100. That is, the slit portions S1 and S2 do not penetrate through the body 100 in the thickness direction T of the body 100.

The slit portions S1 and S2 may be formed by performing pre-dicing on one surface of a coil bar along a virtual boundary line that matches the width direction of each coil component among virtual boundary lines that individualize each coil component, at a coil bar level which is a state before each coil component is individualized. The pre-dicing adjusts depths of the slit portions S1 and S2 so that lead-out portions 331 and 332 to be described later are exposed to inner surfaces of the slit portions S1 and S2. The inner surfaces of the slit portion S1 and S2 may have inner walls substantially parallel to the first and second surfaces 101 and 102 of the body 100, and a bottom surface connecting the inner walls and the first and second surfaces 101 and 102. Meanwhile, hereinafter, for convenience of description, it will be described that the slit portions S1 and S2 have the inner wall and the bottom surface, but the scope of the present disclosure is not limited thereto. As an example, the inner surface of the first slit portion S1 may be formed to have a curved shape connecting the first surface 101 and the sixth surface 106 of the body 100 in the cross-section in the length direction L-thickness direction T, and thus, the above-described inner wall and bottom surface may not be distinguished.

Meanwhile, the inner surfaces of the slit portions S1 and S2 also corresponds to the surface of the body 100, but in the present specification, for the convenience of understanding and explanation of the present disclosure, it is assumed that the inner surfaces of the slit portions S1 and S2 are distinguished from the first to sixth surfaces 101, 102, 103, 104, 105, and 106 that are the surfaces of the body 100.

The coil portion 300 may be buried in the body 100, and may implement characteristics of the coil component. For example, when the coil component 1000 according to the present exemplary embodiment is used as a power inductor, the coil portion 300 may serve to store an electric field as a magnetic field to maintain an output voltage, resulting in stabilization of power of an electronic device.

The coil portion 300 may include coil patterns 311 and 312, vias 321, 322, and 323, the lead-out portions 331 and 332, and dummy lead-out portions 341 and 342.

Referring to FIGS. 1, 3, 6 and 7, based on the directions of FIGS. 3 and 6, the first coil pattern 311 and the lead-out portions 331 and 332 may be disposed on the lower surface of the substrate 200 opposing the sixth surface 106 of the body 100, and the second coil pattern 312 and the dummy lead-out portions 341 and 342 may be disposed on the upper surface of the substrate 200 opposing the fifth surface of the body 100. On the lower surface of the substrate 200, the first coil pattern 311 may be contact with the second lead-out portion 332, and each of the first coil pattern 311 and the second lead-out portion 332 may be disposed to be spaced apart from the first lead-out portion 331. The second lead-out portion 332 may be formed to extend from an outermost turn of the first coil pattern 311.

The first lead-out portion 331 may be exposed to the first surface 101 of the body 100 and the inner surface of the first slit portion S1, respectively. The first lead-out portion 331 may be continuously exposed to the first surface 101 of the body 100, the bottom surface of the first slit portion S1, and the inner wall of the first slit portion S1.

The second lead-out portion 332 may be exposed to the second surface 102 of the body 100 and the inner surface of the second slit portion S2, respectively. The second lead-out portion 332 may be continuously exposed to the second surface 102 of the body 100, the bottom surface of the second slit portion S2, and the inner wall of the second slit portion S2.

Referring to FIGS. 3 and 7, on the upper surface of the substrate 200, the second coil pattern 312 may be in contact with the first dummy lead-out portion 341, and each of the second coil pattern 312 and the first dummy lead-out portion 341 may be disposed to be spaced apart from the second dummy lead-out portion 342. The first dummy lead-out portion 341 may be formed to extend from an outermost turn of the second coil pattern 312. The first dummy lead-out portion 341 is exposed to the first surface 101 of the body 100. The second dummy lead-out portion 342 may be exposed to the second surface 102 of the body 100.

Referring to FIG. 6, the first via 321 may penetrate through the substrate 200 to be in contact with the innermost turn of the first coil pattern 311 and the innermost turn of the second coil pattern 312, respectively.

Referring to FIG. 3, the second via 322 may penetrate through the substrate 200 to connect the first lead-out portion 331 and the first dummy lead-out portion 341 to each other. The third via 323 may penetrate through the substrate 200 to connect the second lead-out portion 332 and the second dummy lead-out portion 342 to each other. By doing so, the coil portion 300 may function as a single coil as a whole.

Here, referring to FIG. 8 illustrating a modification corresponding to FIG. 3, since the second dummy lead-out portion 342 is independent of the electrical connection of the remaining components of the coil portion 300, in the present modification, the second dummy lead-out portion 342 and the third via 323 may be omitted. In this case, a volume of the magnetic material in the body 100 may increase by a volume corresponding to the second dummy lead-out portion 342, while warpage of the substrate 200 may occur due to an asymmetric structure.

Each of the first coil pattern 311 and the second coil pattern 312 may have a planar spiral shape in which at least one turn is formed around the core 110. As an example, the first coil pattern 311 may have at least one turn formed around the core 110 on one surface of the substrate 200.

The first lead-out portion 331 and the second lead-out portion 332 may be exposed to the bottom surfaces and inner walls of the slit portions S1 and S2. That is, the depth of the slit portions S1 and S2 may be adjusted to extend to at least a portion of the first and second lead-out portions 331 and 332. One surface of the first and second lead-out portions 331 and 332 exposed to the inner walls and bottom surfaces of the slit portions S1 and S2 may have higher surface roughness than that of the other surfaces of the first and second lead-out portions 331 and 332. For example, when the first and second lead-out portions 331 and 332 are formed by electroplating, and then, the first and second lead-out portions 331 and 332 and the body 100 may be provided with the slit portions S1 and S2, some of the first and second lead-out portions 331 and 332 may be removed in the pre-dicing process for forming the slit portions S1 and S2. By doing so, one surface of the first and second lead-out portions 331 and 332 exposed to the inner walls and bottom surfaces of the slit portions S1 and S2 may have higher surface roughness than that of the rest surfaces of the first and second lead-out portions 331 and 332 due to grinding of a pre-dicing tip. The first and second lead-out portions 331 and 332 exposed to the bottom surfaces and inner walls of the slit portions S1 and S2 may be formed with external electrodes 410 and 420 to be described later, so the coil portion 300 and the external electrodes 410 and 420 may be connected to each other, the external electrodes 410 and 420 may be formed of a thin film, so a bonding force with the first and second lead-out portions 331 and 332 may be weak, and the external electrodes 410 and 420 may be in contact with one surface of the first and second lead-out portions 331 and 332 having relatively high surface roughness, so a bonding force between the external electrodes 410 and 420 and the first and second lead-out portions 331 and 332 may be improved. Accordingly, bonding reliability between the coil portion 300 and the external electrodes 410 and 420 may be improved.

At least one of the coil patterns 311 and 312, the vias 321, 322, and 323, the lead-out portions 331 and 332, and the dummy lead-out portions 341 and 342 may include one or more conductive layers. For example, when the first coil pattern 311, the lead-out portions 331 and 332, and the vias 321, 322, and 323 are formed on the lower surface of the substrate 200 by plating, the first coil pattern 311, the lead-out portions 331 and 332, and the vias 321, 322, and 323 may each include a first conductive layer formed by electroless plating or the like, and a second conductive layer disposed on the first conductive layer.

The first conductive layer may be a seed layer for forming the second conductive layer on the substrate 200 by plating. The second conductive layer may be an electroplating layer. Here, the electroplating layer may have a single-layer structure or have a multilayer structure. The electroplating layer having the multilayer structure may be formed in a conformal film structure in which another electroplating layer covers any one electroplating layer, or may be formed in a shape in which another electroplating layer is stacked on only one surface of any one electroplating layer. The seed layer of the first coil pattern 311 and the seed layer of the second lead-out portion 332 may be formed integrally, such that a boundary therebetween may not be formed, but are not limited thereto. The electroplating layer of the first coil pattern 311 and the electroplating layer of the second lead-out portion 332 may be formed integrally, such that a boundary therebetween may not be formed, but are not limited thereto.

For example, as illustrated in FIGS. 3 and 6, the coil patterns 311 and 312, the lead-out portions 331 and 332, and the dummy lead-out portions 341 and 342 may protrude on the lower surface and upper surface of the substrate 200, respectively. As another example, the first coil pattern 311 and the lead-out portions 331 and 332 may protrude on the lower surface of the substrate 200, and the second coil pattern 312 and the dummy lead-out portions 341 and 342 may be embedded in the upper surface of the substrate 200 and the upper surfaces of the second coil pattern 312 and the dummy lead-out portions 341 and 342 may be exposed to the upper surface of the substrate 200. In this case, a recessed portion may be formed in at least one of the upper surface of the second coil pattern 312 and the upper surfaces of the dummy lead-out portions 341 and 342, so the upper surface of the substrate 200 and the upper surface of the second coil pattern 312 and/or the upper surfaces of the dummy lead-out portions 341 and 342 may not be located on the same plane.

Each of the coil patterns 311 and 312, the vias 321, 322, and 323, the lead-out portions 331 and 332, and the dummy lead-out portions 341 and 342 may be formed of a conductive material such as copper (Cu), aluminum (Al), silver (Ag), tin (Sn), gold (Au), nickel (Ni), lead (Pb), titanium (Ti), or alloys thereof, but is not limited thereto.

The insulating film IF may insulate the coil patterns 311 and 312, the lead-out portions 331 and 332, and the dummy lead-out portions 341 and 342 from the body 100. The insulating film IF may include, for example, parylene, but is not limited thereto. The insulating film IF may be formed by a method such as vapor deposition, but is not limited thereto, and may be formed by laminating an insulating layer on both surfaces of the substrate 200. Meanwhile, the insulating film IF may have a structure including a portion of a plating resist used for forming the coil portion 300 by electroplating, but is not limited thereto.

The external electrodes 410 and 420 may be disposed to be spaced apart from each other on one surface 106 of the body 100 and extend to the first and second slit portions S1 and S2, respectively, to be connected to the first and second lead-out portions 331 and 332.

Specifically, the first external electrode 410 may include a first connection part 411 that is disposed on the bottom surface and the inner wall of the first slit portion S1 to be in contact with the first lead-out portion 331 exposed to the bottom surface and the inner wall of the first slit portion S1, and a first pad part 412 that extends the sixth surface 106 of the body 100 from the first connection part 411.

The second external electrode 420 may include a second connection part 421 that is disposed on the bottom surface and the inner wall of the second slit portion S2 to be in contact with the second lead-out portion 332 exposed to the bottom surface and the inner wall of the second slit portion S2, and a second pad part 422 that extends to the sixth surface 106 of the body 100 from the second connection part 421.

The first pad part 412 and the second pad part 422 may be disposed to be spaced apart from each other on the sixth surface 106 of the body 100.

The connection parts 411 and 421 may be disposed at central portions of the inner surfaces of the slit portions S1 and S2 in the width direction W. The pad parts 412 and 422 may be disposed at a central portion of the sixth surface of the body 100 in the width direction W. That is, each of the connection parts 411 and 421 and the pad parts 412 and 422 may not extend to the third and fourth surfaces 103 and 104 of the body 100.

Meanwhile, in FIGS. 1 and 2, the lengths of the connection parts 411 and 421 along the width direction W and the lengths of the pad parts 412 and 422 along the width direction W are illustrated to be the same, but this is only an example. Accordingly, the scope of the present disclosure is not limited to the matters illustrated in FIGS. 1 and 2. For example, the lengths of the pad parts 412 and 422 along the width direction W may be longer than the lengths of the connection parts 411 and 421 along the width direction W.

The external electrodes 410 and 420 may each be formed along the inner surfaces of the slit portions S1 and S2 and the sixth surface 106 of the body 100, respectively. That is, the external electrodes 410 and 420 are formed in the form of a film conformal to the inner surfaces of the slit portions S1 and S2 and the sixth surface 106 of the body 100. Each of the external electrodes 410 and 420 may be integrally formed on the inner surfaces of the slit portions S1 and S2 and the sixth surface 106 of the body 100. In this case, the external electrodes 410 and 420 may be formed by a thin film process such as a sputtering process or a plating process.

The external electrodes 410 and 420 may be formed of a conductive material such as copper (Cu), aluminum (Al), silver (Ag), tin (Sn), gold (Au), nickel (Ni), lead (Pb), chromium (Cr), titanium (Ti), or alloys thereof, but are not limited thereto.

The external electrodes 410 and 420 may be formed in a multilayer structure. For example, the external electrodes 410 and 420 may include a first layer including copper (Cu) and a second layer 413 formed on the first layer, respectively. The first layer may include the connection parts 411 and 421 and the pad parts 412 and 422. The second layers 413 and 423 may be disposed on the pad parts 412 and 422 and may be formed in a single-layer or multilayer structure. When the second layers 413 and 423 have a multilayer structure, the second layers 413 and 423 may include a first conductive layer including nickel (Ni) and a second conductive layer including tin (Sn).

The first layer may be formed by electroplating, by vapor deposition such as sputtering, or by applying and curing conductive paste containing conductive powder such as copper (Cu) and/or silver (Ag). The second layers 413 and 423 may be formed by electroplating.

In the present exemplary embodiment, an insulating layer disposed on an outer side surface of the coil component 1000 may include a lower insulating layer 510 disposed on the sixth surface 106 of the body 100, a surface insulating layer 520 covering an entire surface of the coil component 1000 excluding exposed portions of the pad parts 412 and 422 of the external electrodes 410 and 420 from the outermost side of the coil component 1000, and a slit insulating layer 530 disposed between the surface insulating layer 520 and the connection parts 411 and 421 of the external electrodes 410 and 420 in the slit portions S1 and S2. Hereinafter, the lower insulating layer 510, the slit insulating layer 530, and the surface insulating layer 520 will be described in detail in order according to a process sequence in which each insulating layer is formed.

Referring to FIGS. 2, 3 and 6, the lower insulating layer 510 is disposed on the sixth surface 106 of the body 100. The lower insulating layer 510 may cover at least portions of the sixth surface 106 of the body 100 excluding the area where the pad parts 412 and 422 of the external electrodes 410 and 420 are disposed.

The lower insulating layer 510 may have an average thickness close to 15 μm. Here, the average thickness of the lower insulating layer 510 may refer to an arithmetic mean value of lengths of at least three or more equally spaced line segments among a plurality of line segments that connect an inner boundary line corresponding to an inner surface of the lower insulating layer 510 in contact with the sixth surface 106 of the body 100 and an outer boundary line corresponding to an outer surface of the lower insulating layer 510, illustrated in an image of a cross-section of the coil component 1000 in the length direction L-thickness direction T at a central portion of the coil component 1000 in the width direction W, captured by an optical microscope or a scanning electron microscope (SEM), and are parallel to the thickness direction T.

The lower insulating layer 510 may be a plating resist used to form the external electrodes 410 and 420 by plating. The lower insulating layer 510 may be formed by forming an insulating material for forming a lower insulating layer on the entire sixth surface 106 of the body 100 and then removing a part corresponding to an area where the pad parts 412 and 422 of the external electrodes 410 and 420 are disposed. Alternatively, the lower insulating layer 510 may be formed by selectively forming the insulating material for forming the lower insulating layer in the area of the sixth surface 106 of the body 100 excluding the area where the pad parts 412 and 422 are disposed. The lower insulating layer 510 may include an insulating resin such as epoxy.

The slit insulating layer 530 may be disposed on the slit portions S1 and S2 to cover at least portions of the connection parts 411 and 421 of the first and second external electrodes 410 and 420, respectively. The slit insulating layer 530 may cover at least portions of the connection parts 411 and 421, thereby preventing a short-circuit between the coil component 1000 and other electronic components according to the present exemplary embodiment.

The average thickness of the slit insulating layer 530 may be 40 μm or more and 50 μm or less. Here, the average thickness of the slit insulating layer 530 may refer to an arithmetic mean value of lengths of at least three or more equally spaced line segments, respectively, among a plurality of line segments that connect an inner boundary line corresponding to an inner surface of the slit insulating layer 530 in contact with the inner wall of the slit S1 and an outer boundary line corresponding to an the outer surface of the slit insulating layer 530, illustrated in an image of a cross-section of the coil component 1000 in the length direction L-thickness direction T at a central portion of the coil component 1000 in the width direction W, captured by an optical microscope or a scanning electron microscope (SEM), and are parallel to the length direction L. Alternatively, the average thickness of the slit insulating layer 530 may refer to the arithmetic mean value of the lengths of at least three or more equally spaced line segments among the plurality of line segments that connect the inner boundary line corresponding to the inner surface of the slit insulating layer 530 in contact with the bottom surface of the slit S1 illustrated in the image of the cross-section and the outer boundary line corresponding to the outer surface of the slit insulating layer 530 illustrated in the image of the cross-section, and are parallel to the thickness direction T.

The slit insulating layer 530 may be formed by forming the slit insulating layer 530 for forming the insulating material on the slit portions S1 and S2 on which the connection parts 411 and 421 are formed by a method such as a printing method, vapor deposition, a spray coating method, and a film lamination method, but is not limited thereto.

The slit insulating layer 530 may include a thermoplastic resin such as polystyrenes, vinyl acetates, polyesters, polyethylenes, polypropylenes, polyamides, rubbers, or acryls, a thermosetting resin such as phenols, epoxies, urethanes, melamines, or alkyds, a photosensitive resin, parylene, $SiO_x$, or $SiN_x$.

The surface insulating layer 520 may be disposed on the first and second surfaces 101 and 102 of the body 100 and the slit portions S1 and S2, respectively. The surface insulating layer 520 may be disposed to cover at least portions of the slit insulating layer 530 covering the connection parts 411 and 421 of the external electrodes 410 and 420 in the slit portions S1 and S2.

Referring to FIGS. 3 and 4, the surface insulating layer 520 may partially extend from the slit portions S1 and S2 to cover a portion of the pad parts 412 and 422 of the external electrodes 410 and 420 disposed on the sixth surface 106 of the body 100. That is, a portion of the surface insulating layer 520 may extend onto an edge portion where the connection parts 411 and 421 and the pad parts 412 and 422 of the external electrodes 410 and 420 vertically meet. In addition, the surface insulating layer 520 may cover areas of the lead-out portions 331 and 332 exposed to the first and second surfaces 101 and 102 of the body 100.

As such, through a double insulating structure including the surface insulating layer 520 and the slit insulating layer 530 and a structure in which the surface insulating layer 520 partially extends onto the edge portions of the external electrodes 410 and 420, it is possible to prevent plating spread on the surface of the coil component 1000 according to the present exemplary embodiment, and when mounting the coil component 1000 on a mounting board such as a printed circuit board, it is possible to prevent short-circuit between the coil component 1000 according to the present exemplary embodiment and other electronic components mounted adjacent to the coil component 1000.

Referring to FIG. 4, the average thickness of the surface insulating layer 520 may be 1 μm or more and 5 μm or less. The reason for forming the surface insulating layer 520 to have the above-described thickness is to increase an effective volume of the body 100 and an effective volume of the magnetic material compared to the same component size. Specifically, when the thickness of the surface insulating layer 520 is less than 1 μm, a minimum value of a normal range of an insulation voltage may not be reached, and when the thickness of the surface insulating layer 520 exceeds 5 μm, the problems such as the reduction in productivity, the increase in the size of the entire part, and the reduction in the effective volume of the magnetic material based on the parts of the same size may occur.

That is, a withstand voltage characteristics that increase due to the surface insulating layer 520 may increase in proportion to the thickness of the surface insulating layer 520, but on the contrary, as the thickness of the surface insulating layer 520 that does not affect the inductance characteristics of the coil component 1000 increases, the effective volume of the body 100 may decrease compared to the same component size. Accordingly, the optimal thickness of the surface insulating layer 520 to obtain an effect compared to the existing method in terms of the effective volume while maintaining the withstand voltage characteristics may be 1 μm or more and 5 μm or less.

Conventionally, the surface insulating layer formed on the surface of the body may be formed through a thick-film process of printing an insulating paste, and thus, there may be a problem that the thickness is relatively thick. According to the present disclosure, by forming the surface insulating layer 520 through a thin-film process, it is possible to increase the effective volume of the body 100 and the effective volume of the magnetic material compared to the same size of the component.

Table 1 is experimental data derived from the thickness and effective volume of the surface insulating layer 520 of the coil component 1000 for each shape of the external electrodes 410 and 420. Referring to Table 1, when the thickness of the surface insulating layer 520 has a value of 5 μm or less, it may be seen that the effective volume of the component is the highest as 93.2%.

TABLE 1

| (Unit:mm) | Hi general electrode structure | BL lower electrode structure | Thin film insulating lower electrode structure |
|---|---|---|---|
| Length (L) | 2.00 | 2.00 | 2.00 |
| Width (W) | 1.20 | 1.20 | 1.20 |
| Thickness (T) | 0.65 | 0.65 | 0.65 |
| Volume (V) | 1.560 | 1.560 | 1.560 |
| Upper insulation | 0.025 | 0.015 | 0.005 |
| L insulation | 0.030 | 0.010 | 0.005 |
| W insulation | 0.0125 | 0.010 | 0.005 |
| End surface plating | 0.010 | 0.000 | 0.005 |
| Lower insulation | 0.022 | 0.022 | 0.015 |
| Body length | 1.92 | 1.33 | 1.98 |
| Body width | 1.175 | 1.18 | 1.19 |
| Body thickness | 0.60 | 0.61 | 0.63 |
| Slit length | 0.09 | 0.05 | 0.05 |
| Slit thickness | 0.05 | 0.25 | 0.25 |
| Slit volume | 0.0106 | 0.0205 | 0.0293 |
| Body volume | 1.350 | 1.403 | 1.455 |
| Effective volume | 86.5% | 89.9% | 93.2% |

Meanwhile, the average thickness of the surface insulating layer 520 may refer to an arithmetic mean value of lengths of at least three or more equally spaced line segments among a plurality of line segments that connect an inner boundary line corresponding to an inner surface of the surface insulating layer 520 in contact with the first surface 101 of the body 100 and an outer boundary line corresponding to an outer surface of the surface insulating layer 520, illustrated in an image of a cross-section of the coil component 1000 in the length direction L-thickness direction T at a central portion of the coil component 1000 in the width direction W, captured by an optical microscope or a scanning electron microscope (SEM), and are parallel to the length direction L.

Meanwhile, the surface insulating layer 520 may be disposed on the surface of the slit insulating layer 530 to extend to cover a portion of the pad parts 412 and 422 of the external electrodes 410 and 420. That is, a portion of the surface insulating layer 520 may be formed to extend onto an edge portion where the connection parts 411 and 421 and the pad parts 412 and 422 of the external electrodes 410 and 420 meet.

Referring to FIG. 4, the length L1 of the area where the surface insulating layer 520 extends may be 1 μm or more and 50 μm or less. Here, a length L1 of the extending area may be defined as a shortest distance from a virtual plane that is substantially parallel to the first surface 101 and the second surface 102 of the body 100 and includes the surface insulating layer 520 to an end portion of the surface insulating layer 520 extending onto the edge portion where the connection parts 411 and 421 and the pad parts 412 and 422 of the external electrodes 410 and 420 meet.

Meanwhile, when the surface insulating layer 520 is disposed directly on the connection parts 411 and 421 without the slit insulating layer 530, the length L1 of the area where the surface insulating layer 520 extends may be 1 μm or more and 30 μm or less.

The surface insulating layer 520 may be further disposed on each of the third to fifth surfaces 103, 104, and 105 of the body 100. That is, for example, the surface insulating layer 520 may cover the first to fifth surfaces 101, 102, 103, 104, and 105 of the body 100, and the slit portions S1 and S2, respectively. In this case, the surface insulating layer 520 may be integrally formed with the first to fifth surfaces 101, 102, 103, 104, and 105 of the body 100, and the slit portions S1 and S2.

Referring to FIGS. 3 and 5, the surface insulating layer 520 may be formed in a state in which the lower insulating layer 510 is formed on the sixth surface 106 of the body 100. In this case, the surface insulating layer 520 may be formed to cover both side surfaces of the lower insulating layer 510 on the same plane as the third and fourth surfaces 103 and 104 of the body 100, but the scope of the present disclosure is not limited thereto.

Referring to FIG. 5, at an interface between the lower insulating layer 510 and the pad parts 412 and 422 of the external electrodes 410 and 420, the lower insulating layer 510 may be formed between the sixth surface 106 of the body 100 and the pad parts 412 and 422 on the surface in contact with the pad parts 412 and 422 to overlap a portion of the pad parts 412 and 422 and the second layers 413 and 423.

Meanwhile, the surface insulating layer 520 may be disposed on the surface of the lower insulating layer 510 to extend to cover a portion of the pad parts 412 and 422 at a boundary portion between each of the pad parts 412 and 422 of the external electrodes 410 and 420 and the lower insulating layer 510. That is, the double insulating structure in which the lower insulating layer 510 and the surface insulating layer 520 are included may be formed in an area excluding the pad parts 412 and 422 of the external electrodes 410 and 420 from the sixth surface 106 of the body 100, and a portion of the surface insulating layer 520 may be formed to extend onto the pad parts 412 and 422 and the second layers 413 and 423.

Here, a length L2 of the area where the surface insulating layer 520 extends may be 1 μm or more and 30 μm or less. Here, the length L2 of the extending area may be defined as an average distance between a plane passing an outermost side of an interface between the lower insulating layer 510 and each of the pad parts 412 and 422 and a plane passing through an extending end portion of the surface insulating layer 520, among virtual planes substantially vertical to the sixth surface 106 of the body 100.

The surface insulating layer 520 may be formed by vapor deposition (VD) such as chemical vapor deposition (CVD), but is not limited thereto. The surface insulating layer 520 may include at least one component of parylene-N ($C_{16}H_{14}Cl_2$), ethylene glycol dimethacrylate (EGDMA, $C_{10}H_{14}O_4$), glycidyl methacrylate (GMA, $C_7H_{10}O_3$), 2,4,6-trivinyl-2,4,6-trimethyl cyclotrisiloxane (V3D3, $C_9H_{18}O_3Si_3$), 2,4,6,8-tetramethyl-2,4,6,8-tetravinyl cyclotetrasiloxane (V4D4, $C_{12}H_{24}O_4Si_4$), 3,3,4,4,5,5,6,6,7,7,8,8,9,9,10,10,10-heptadecafluorodecyl methacrylate (PFDMA, $C_{14}H_9F_{17}O_2$), 4-vinyl-pyridine (4VP, $C_7H_7N$), ethylene glycol diacrylate (EGDA, $C_{10}H_{14}O_5$), ethyl acrylate (EA, $C_5H_8O_2$), 2-hydroxyethylmethacrylate (HEMA, $C_6H_{10}O_3$), methacrylic acid (MAA, $C_4H_6O_2$), methacrylic anhydride (MAH, $C_8H_{10}O_3$), or divinylbenzene (DVB, $C_{10}H_{10}$), but is not limited thereto.

By the above-described configuration, the coil component 1000 according to the present exemplary embodiment may be reduced in size and easily implement a lower electrode structure. That is, unlike the related art, since the external electrodes 410 and 420 are not formed to protrude from both end surfaces 101 and 102 or both side surfaces 103 and 104 of the body 100, the overall length and width of the coil component 1000 may not be increased. In addition, since the external electrodes 410 and 420 are formed by the thin film process, the external electrodes 410 and 420 may be formed to be relatively thin, thereby minimizing the increase in the thickness of the coil component 1000. In addition, the coil component 1000 according to the present exemplary embodiment may be formed to be relatively thin by the thin film process, thereby maximizing the effective volume of the magnetic material.

In addition, by the double insulating structure such as the slit insulating layer 530 and the surface insulating layer 520 or the lower insulating layer 510 and the surface insulating layer 520, the insulation voltage may be increased compared to the single insulating structure. Table 2 is a table showing a magnitude V of the insulation voltage according to the thickness (μm) of the insulating layer when the lower insulating layer 510 is formed of an acrylic resin through inkjet insulation. Table 3 is a table showing the magnitude V of the insulation voltage that is additionally increased according to the thickness of the surface insulating layer 520 further formed on the lower insulating layer 510 when the lower insulating layer 510 formed of the acrylic resin through the inkjet insulation has a thickness of 15 μm. Table 4 is a table sequentially showing the minimum value of the normal range in the specification of the coil component when the thin film insulating layer is formed, the characteristics of the coil component according to the present disclosure, and the characteristics of the coil component according to the existing method.

Referring to Tables 2 and 3, through an experiment on the characteristics of the insulation voltage according to the thickness of the insulating layer, compared to the case of having an insulation voltage of 375V when the lower insulating layer 510 is inkjet-insulated with the acrylic resin (unit film insulation voltage: 25V/μm) having a thickness of 15 μm, the insulation voltage is additionally increased to 18.74V when the surface insulating layer 520 of the EGDMA (unit film insulation voltage: 9.37V/μm) component having a thickness of 2 μm is further disposed on the lower insulating layer 510. As a result, the lower insulating layer 510 has an insulation voltage of 393.74V through this double insulation structure, thereby increasing the insulation voltage to about 4.76% compared to the single insulation structure.

Referring to Table 4, in the case of the double insulating structure of the present disclosure, the thickness of the lower insulating layer 510 may correspond to a range of 5 μm or more, which is the minimum thickness for securing visibility of the insulating layer during the inkjet insulation, and the thickness of the surface insulating layer 520 may be formed to be 2 μm, which corresponds to the thin film compared to the existing method. Through this structure, it is possible to provide a coil component having an improved effective volume ratio of 93% compared to the existing method, while the insulation voltage has a value of 393.74 V which is 80 V or more as the minimum value of the normal range.

TABLE 2

Magitude of Insulation Voltage According to Thickness of Lower insulating Layer (Primary insulation)

| Thickness (μm) | insulation voltage (V) |
|---|---|
| 1 | 5 |
| 2 | 50 |
| 3 | 75 |
| 4 | 100 |
| 5 | 125 |
| 6 | 150 |
| 7 | 175 |
| 8 | 200 |
| 9 | 225 |
| 10 | 250 |
| 11 | 275 |
| 12 | 300 |
| 13 | 325 |
| 14 | 350 |
| 15 | 375 |
| 16 | 400 |
| 17 | 425 |
| 18 | 450 |
| 19 | 475 |
| 20 | 500 |

TABLE 3

Magnitude of insulation voltage additionally insulated according to surface insulating layer when surface insulating layer (secondary insulation) is diposed on lower insulating layer of is μm

| Thickness (μm) | Insulation voltage (V) |
|---|---|
| 1 | 9.37 |
| 2 | 18.74 |
| 3 | 28.11 |
| 4 | 37.47 |
| 5 | 49.34 |
| 6 | 56.21 |
| 7 | 65.58 |
| 8 | 74.95 |
| 9 | 64.32 |
| 10 | 93.63 |
| 11 | 103.05 |
| 12 | 112.42 |
| 13 | 121.79 |
| 14 | 131.16 |
| 15 | 140.53 |
| 16 | 149.39 |
| 17 | 159.26 |
| 18 | 168.63 |
| 19 | 173.00 |
| 20 | 187.37 |

TABLE 4

Comparison with existing method

| | Based on minimum value | | Present Invention | | Existing Method |
|---|---|---|---|---|---|
| Thickness of primary insulation | 5 μm | ≤ | 15 μm | ≤ | 15 μm |
| Thickness of secondary insulation | 0 | ≤ | 2 μm | ≤ | 15 μm |
| Effective volume of chip | — | ≥ | 93% | ≥ | 89.9% |
| Insulation voltage | 80 V | ≤ | 393.74 V | ≤ | 525.53 V |

Second Exemplary Embodiment

Figure 9:
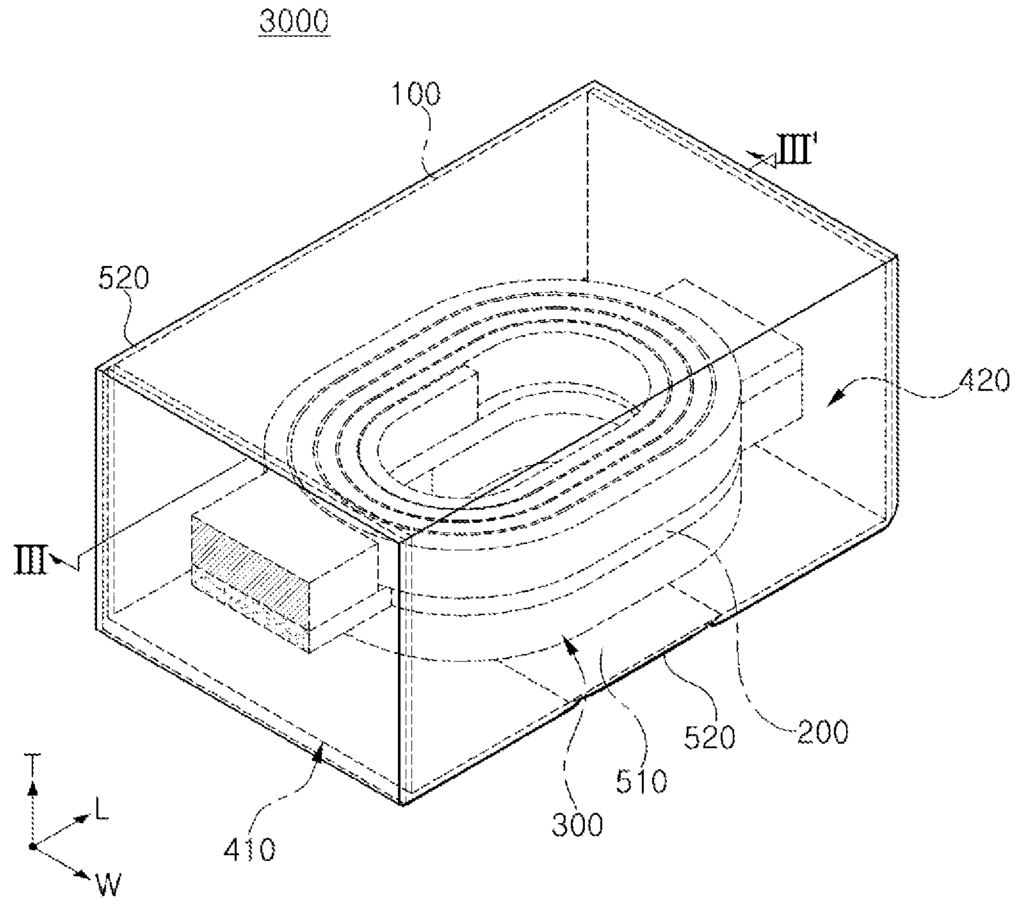
FIG. 9 is a perspective view schematically illustrating a coil component according to another exemplary embodiment in the present disclosure.
Figure 10:
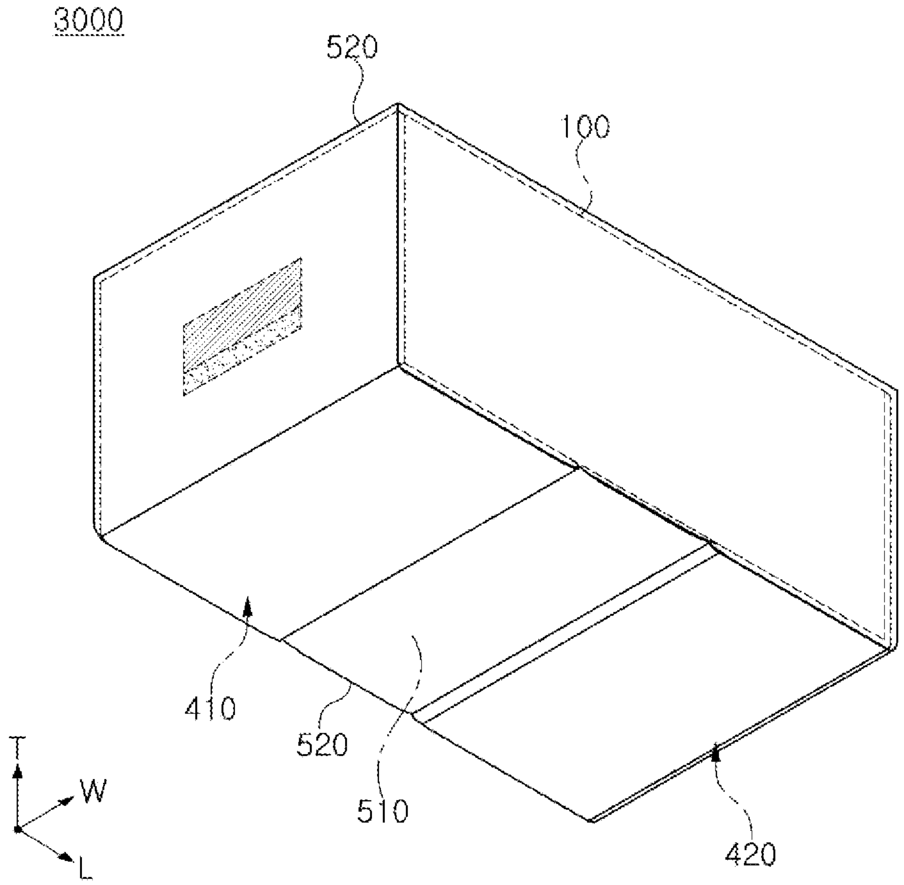
FIG. 10 is a diagram illustrating the coil component of FIG. 9 as viewed from a lower side.
Figure 11:
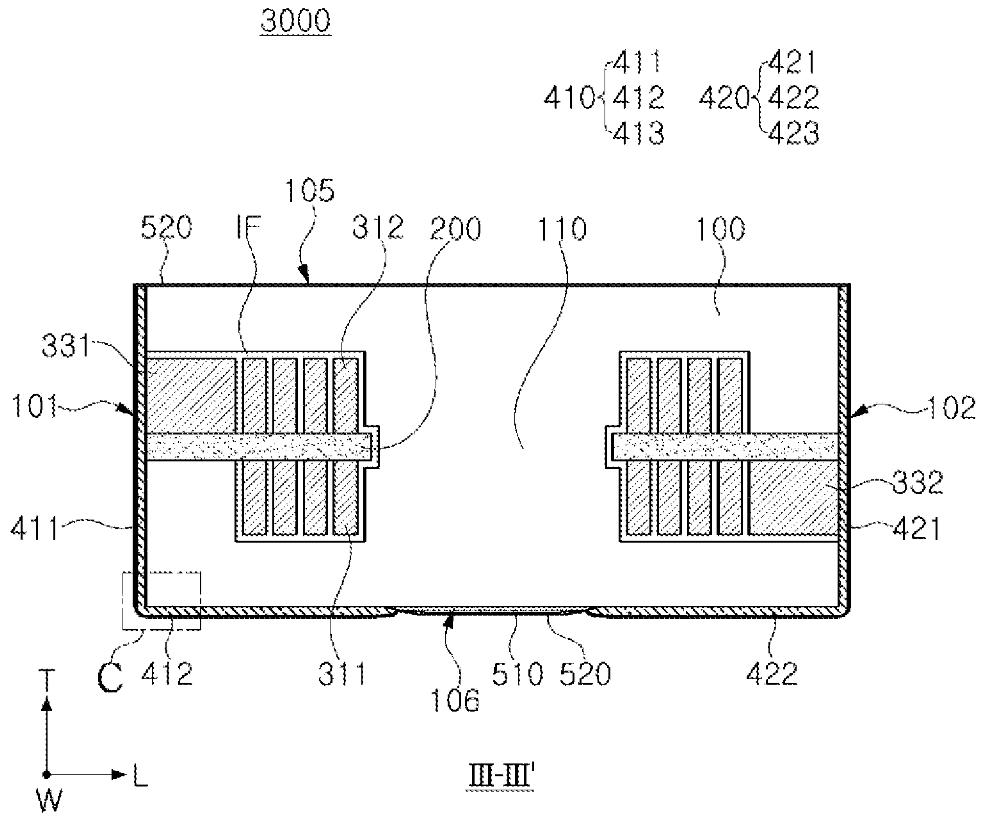
FIG. 11 is a cross-sectional view taken along line III-III' of FIG. 9.
Figure 12:
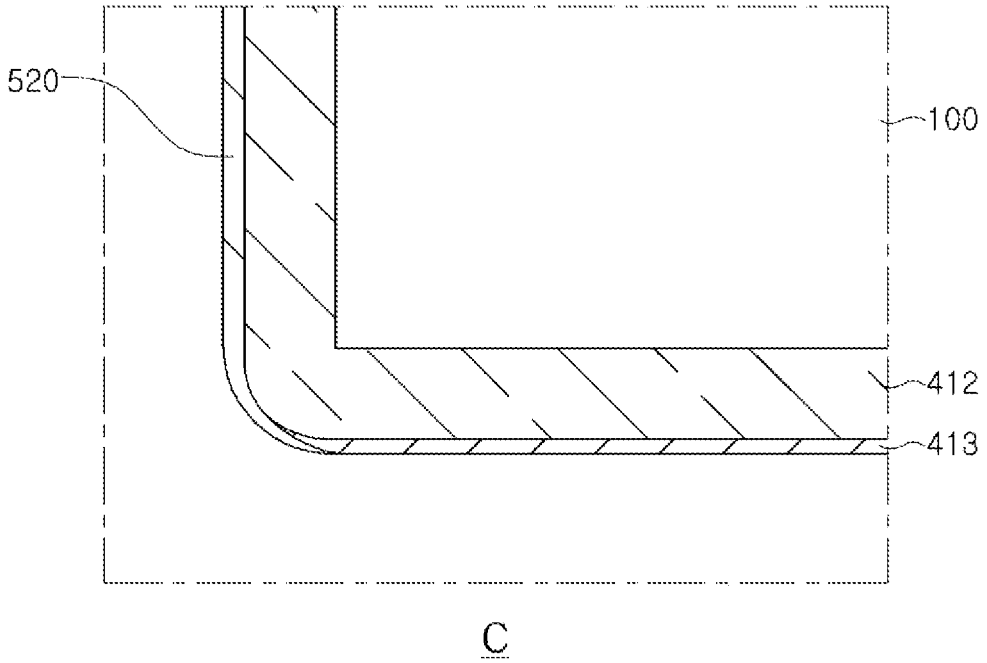
FIG. 12 is an enlarged view illustrating area C of FIG. 11.

FIG. 9 is a perspective view schematically illustrating a coil component 3000 according to another exemplary embodiment in the present disclosure. FIG. 10 is a diagram illustrating the coil component 3000 of FIG. 9 as viewed from the lower side. FIG. 11 is a cross-sectional view taken along line III-III' of FIG. 9. FIG. 12 is an enlarged view illustrating area C of FIG. 11.

Referring to FIGS. 9 to 12, compared with the coil component 1000 according to the exemplary embodiment in the present disclosure, the coil component 3000 according to another exemplary embodiment in the present disclosure is different in terms of the shape of the coil portion 300 and the external electrodes 410 and 420 and has a difference that there are no slit portions S1 and S2. Therefore, in describing the present exemplary embodiment, only the coil portion 300 and the external electrodes 410 and 420 different from those in the exemplary embodiment in the present disclosure will be described. The description of an exemplary embodiment of the present disclosure may be applied to the remaining components of the present exemplary embodiment as it is.

The coil portion 300 applied to the present exemplary embodiment may include coil patterns 311 and 312, a first via 321, and lead-out portions 331 and 332.

The first coil pattern 311 and the second lead-out portion 332 may be disposed on the lower surface of the substrate 200 opposing the sixth surface 106 of the body 100, and the second coil pattern 312 and the first lead-out portion 331 may be disposed on the upper surface of the substrate 200 opposing the fifth surface 105 of the body 100. On the lower surface of the substrate 200, the first coil pattern 311 may be contact with the second lead-out portion 332, and each of the first coil pattern 311 and the second lead-out portion 332 may be disposed to be spaced apart from the first lead-out portion 331. The second lead-out portion 332 may be formed to extend from an outermost turn of the first coil pattern 311. The first lead-out portion 331 and the second lead-out portion 332 may be exposed to the first surface 101 and the second surface 102 of the body 100, respectively.

The first via 321 may penetrate through the substrate 200 to be in contact with the innermost turn of the first coil pattern 311 and the innermost turn of the second coil pattern 312, respectively. By doing so, the coil portion 300 may function as a single coil as a whole.

The external electrodes 410 and 420 applied to the present exemplary embodiment may be disposed to be spaced apart from each other on one surface 106 of the body 100, and each extend to the first surface 101 and the second surface 102 of the body 100 to be connected to the first and second lead-out portions 331 and 332.

Specifically, the first external electrode 410 may include a first connection part 411 that is disposed on the first surface 101 of the body 100 to be in contact with the first lead-out portion 331 and a first pad part 412 that extends from the first connection part 411 to the sixth surface 106 of the body 100.

The second external electrode 420 may include a second connection part 421 that is disposed on the second surface 102 of the body 100 to be in contact with the second lead-out portion 332 and a second pad part 422 that extends from the second pad part 422 to the sixth surface 106 of the body 100.

The connection parts 411 and 421 may have a shape that covers the entire of the first surface 101 and the second surface 102 of the body 100. The first pad part 412 and the second pad part 422 may be disposed to be spaced apart from each other on the sixth surface 106 of the body 100, and have substantially the same length as a length of the body 100 in a width direction W. That is, each of the connection parts 411 and 421 and the pad parts 412 and 422 may extend to the third and fourth surfaces 103 and 104 of the body 100 in the width direction W.

Referring to FIGS. 10 and 11, the coil component 3000 applied to the present exemplary embodiment does not include the slit portions S1 and S2 and the slit insulating layer 530, but the surface insulating layer 520 may be directly disposed on the connection parts 411 and 421 of the external electrodes 410 and 420.

A portion of the surface insulating layer 520 may extend from the connection parts 411 and 421 of the external electrodes 410 and 420, and may be disposed to cover a portion of the pad parts 412 and 422 of the external electrodes 410 and 420 disposed on the sixth surface 106 of the body 100. That is, a portion of the surface insulating layer 520 may extend onto an edge portion where the connection parts 411 and 421 and the pad parts 412 and 422 of the external electrodes 410 and 420 vertically meet.

As such, through a structure in which the surface insulating layer 520 partially extends onto the edge portions of the external electrodes 410 and 420, it is possible to prevent plating spread on the surface of the coil component 3000 according to the present exemplary embodiment, and when mounting the coil component 3000 on a mounting board such as a printed circuit board, it is possible to prevent a short-circuit between the coil component 1000 according to the present exemplary embodiment and other electronic components mounted adjacent to the coil component 3000.

Third Exemplary Embodiment

Figure 13:
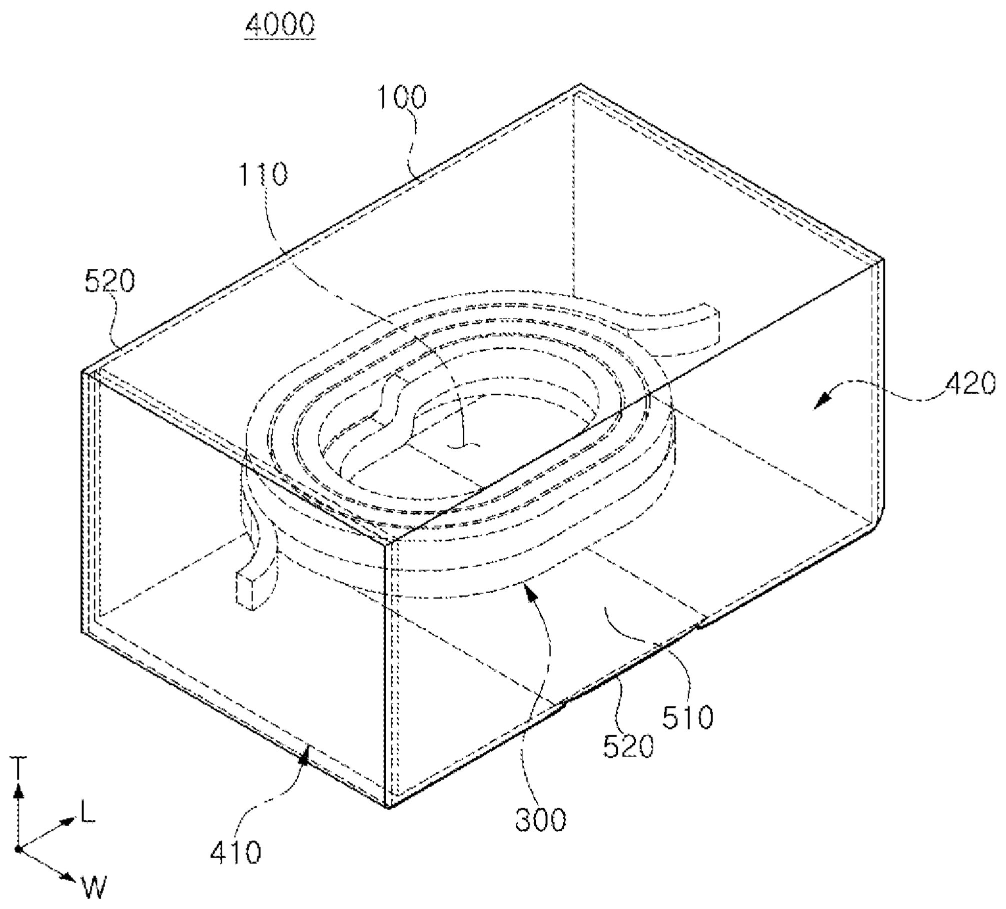
FIG. 13 is a perspective view schematically illustrating a coil component according to still another exemplary embodiment in the present disclosure.

FIG. 13 is a perspective view schematically illustrating a coil component 4000 according to still another exemplary embodiment in the present disclosure.

Referring to FIG. 13, the coil component 4000 according to the present exemplary embodiment may include a coil portion 300 of a winding type. In this case, the coil component 4000 according to the present exemplary embodiment does not include the substrate 200.

The coil portion 300 may be a winding coil formed by winding a metal wire such as a copper wire (Cu-wire) including a metal wire and a coating layer coating a surface of the metal wire. Accordingly, the entire surface of each of a plurality of turns of the coil portion 300 may be coated with the coating layer.

Meanwhile, the metal wire may be a flat wire, but is not limited thereto. When the coil portion 300 is formed of a flat line, a cross section of each turn of the coil portion 300 may have a rectangular shape.

The coating layer may include epoxy, polyimide, liquid crystal polymer (LCP), or the like, or mixtures thereof, but is not limited thereto.

As set forth above, according to the exemplary embodiment in the present disclosure, it is possible to improve an effective volume of a magnetic material, prevent plating spread and short-circuit of an electrode part, and reduce a mounting area.

Hereinabove, the exemplary embodiments in the present disclosure have been described, but those skilled in the art may variously modify and alter the present disclosure by adding, changing, or deleting components without departing from the spirit and scope of the present disclosure defined in the claims, and it is to be considered that these modifications and alterations fall in the scope of the present disclosure.

What is claimed is:

1. A coil component comprising:
   - a body having a first surface, with a first end surface and a second end surface opposing each other;
   - a coil portion including first and second lead-out portions spaced apart from each other and disposed in the body;
   - first and second slit portions respectively formed at an edge portion between the first end surface and the first surface of the body and an edge portion between the second end surface of the body and the first surface of the body, and exposing the first and second lead-out portions;
   - first and second external electrodes disposed to be spaced apart from each other on the first surface of the body, and extending onto the first and second slit portions, respectively, to be connected to the first and second lead-out portions;
   - a slit insulating layer covering at least portions of the first and second external electrodes in the first and second slit portions; and
   - a surface insulating layer disposed on the slit insulating layer, extending to cover a bottom surface of the slit insulating layer, and further extending to cover at least portions of the first or second external electrodes disposed on the first surface of the body.

2. The coil component of claim 1, wherein the surface insulating layer includes at least one component of parylene-N ($C_{16}H_{14}Cl_2$), ethylene glycol dimethacrylate (EGDMA, $C_{10}H_{14}O_4$), glycidyl methacrylate (GMA, $C_7H_{10}O_3$), 2,4,6-trivinyl-2,4,6-trimethyl cyclotrisiloxane (V3D3, $C_9H_{18}O_3Si_3$), 2,4,6,8-tetramethyl-2,4,6,8-tetravinyl cyclotetrasiloxane (V4D4, $C_{12}H_{24}O_4Si_4$), 3,3,4,4,5,5,6,6,7,7,8,8,9,9,10,10,10-heptadecafluorodecyl methacrylate (PFDMA, $C_{14}H_9F_{17}O_2$), 4-vinyl-pyridine (4VP, $C_7H_7N$), ethylene glycol diacrylate (EGDA, $C_{10}H_{14}O_5$), ethyl acrylate (EA, $C_5H_8O_2$), 2-hydroxyethylmethacrylate (HEMA, $C_6H_{10}O_3$), methacrylic acid (MAA, $C_4H_6O_2$), methacrylic anhydride (MAH, $C_8H_{10}O_3$), or divinylbenzene (DVB, $C_{10}H_{10}$).

3. The coil component of claim 1, wherein each of the first and second external electrodes includes a connection part disposed on the first and second slit portions to be in contact with the first and second lead-out portions, and a pad part extending from the connection part to the first surface of the body, and
   - the slit insulating layer is disposed between the connection part, surfaces of each of the first and second slit portions, and the surface insulating layer.

4. The coil component of claim 1, further comprising:

a lower insulating layer covering at least portions of an area of the first surface of the body excluding the first and second external electrodes, wherein the surface insulating layer is further disposed on the lower insulating layer.

5. The coil component of claim 4, wherein the surface insulating layer extends to cover at least portions of the first and second external electrodes from a boundary portion between each of the first and second external electrodes and the lower insulating layer.

6. The coil component of claim 1, wherein the body further has a second surface opposing the first surface of the body, and a first side surface and a second side surface connected to the first surface and the second surface and opposing each other, and the surface insulating layer is further disposed on each of the second surface, the first side surface, and the second side surface of the body.

7. The coil component of claim 1, further comprising:

a substrate disposed within the body, wherein the first and second lead-out portions are disposed on a lower surface of the substrate facing the first surface of the body to be spaced apart from each other, and the coil portion further includes a first coil pattern spaced apart from the first lead-out portion and disposed on a lower surface of the substrate to be connected to the second lead-out portion, a second coil pattern disposed on an upper surface of the substrate, facing a second surface of the body opposing the first surface of the body, and a first dummy lead-out portion disposed on the upper surface of the substrate and connected to the second coil pattern.

8. The coil component of claim 7, wherein the first and second lead-out portions are exposed to the first end surface and the second end surface of the body, respectively.

9. The coil component of claim 7, wherein the coil portion further includes:

a first via penetrating through the substrate to connect the first and second coil patterns to each other; and a second via penetrating through the substrate to connect the first lead-out portion and the first dummy lead-out portion to each other.

10. The coil component of claim 9, wherein the coil portion further includes:

a second dummy lead-out portion disposed to be spaced apart from the second coil pattern and the first dummy lead-out portion, respectively, on the upper surface of the substrate; and a third via penetrating through the substrate to connect the second lead-out portion and the second dummy lead-out portion to each other.

11. A coil component comprising:

a body having a first surface, with a first end surface and a second end surface respectively connected to the first surface and opposing each other;

a coil portion including first and second lead-out portions spaced apart from each other and exposed to the first end surface and the second end surface of the body, respectively;

first and second external electrodes disposed to be spaced apart from each other on the first surface of the body, and extending onto the first end surface and the second end surface of the body, respectively, to be connected to the first and second lead-out portions;

a lower insulating layer covering at least portions of an area of the first surface of the body excluding the first and second external electrodes; and a surface insulating layer covering at least portions of the first and second external electrodes on the first end surface and the second end surface of the body, respectively, and disposed on the lower insulating layer on first surface of the body, wherein the surface insulating layer covers at least portions of the first or second external electrodes disposed on the first surface of the body, and extends to cover at least portions of the first and second external electrodes from a boundary portion between each of the first and second external electrodes and the lower insulating layer, wherein each of the first and second external electrodes includes a connection part disposed on the first end surface and the second end surface of the body to be in contact with the first and second lead-out portions, and a pad part extending from the connection part onto the first surface of the body, and wherein the surface insulating layer covers at least portions of a rest surface of an outer surface of the coil portion excluding the pad part, and partially extends from an edge portion between the connection part and the pad part onto the pad part to cover at least a portion of the pad part.

12. The coil component of claim 11, further comprising:

a substrate disposed within the body.

13. The coil component of claim 12, wherein the coil portion further includes:

a first coil pattern disposed on a lower surface of the substrate facing the first surface of the body and connected to the second lead-out portion;

a second coil pattern disposed on an upper surface of the substrate, facing a second surface of the body opposing the first surface of the body, and connected to the first lead-out portion; and a first via penetrating through the substrate to connect the first and second coil patterns to each other.

14. The coil component of claim 11, wherein the coil portion is a winding coil wound with a metal wire whose surface is coated with a coating part.

15. A coil component comprising:

a body having a first surface, with a first end surface and a second end surface opposing each other;

a coil portion including at least one coil pattern, and first and second lead-out portions spaced apart from each other and extending to the first and second end surfaces, respectively;

first and second external electrodes disposed to be spaced apart from each other on the first surface of the body, and bending toward the first and second lead-out portions to be connected to the first and second lead-out portions, respectively; and at least two insulating layers disposed on the first surface the body and overlapping each other in a thickness direction, wherein the at least two insulating layers comprise:

a lower insulating layer covering at least portions of an area of the first surface of the body excluding the first and second external electrodes; and a surface insulating layer disposed to cover the lower insulating layer and at least portions of the first and second external electrodes, wherein the surface insulating layer is in contact with a bottom surface of the first and second external electrodes.

16. The coil component of claim 15, wherein the first and second external electrodes include a portion extending onto a portion of the lower insulating layer to be interposed between the portion of the lower insulating layer and a portion of the surface insulating layer in the thickness direction.

17. The coil component of claim 15, wherein:

the surface insulating layer includes a first portion covering the first and second external electrodes on the first end surface and the second end surface of the body, respectively, and a second portion disposed on the lower insulating layer on the first surface of the body, the first portion of the surface insulating layer extends from an outermost side of the coil component to cover at least portions of the first and second external electrodes in the thickness direction, and the second portion of the surface insulating layer extends to cover at least portions of the first and second external electrodes from a boundary portion between each of the first and second external electrodes and the lower insulating layer.

18. The coil component of claim 15, further comprising first and second slit portions respectively formed at an edge portion between the first end surface and the first surface of the body and an edge portion between the second end surface of the body and the first surface of the body, and exposing the first and second lead-out portions, wherein the first and second external electrodes extend onto the first and second slit portions, respectively, to be connected to the first and second lead-out portions, and wherein the at least two insulating layers comprise:

a slit insulating layer covering at least portions of the first and second external electrodes in the first and second slit portions; and a surface insulating layer disposed on the slit insulating layer and extending to cover at least portions of the first or second external electrodes disposed on the first surface of the body.

* * * * *